Patented Dec. 12, 1933

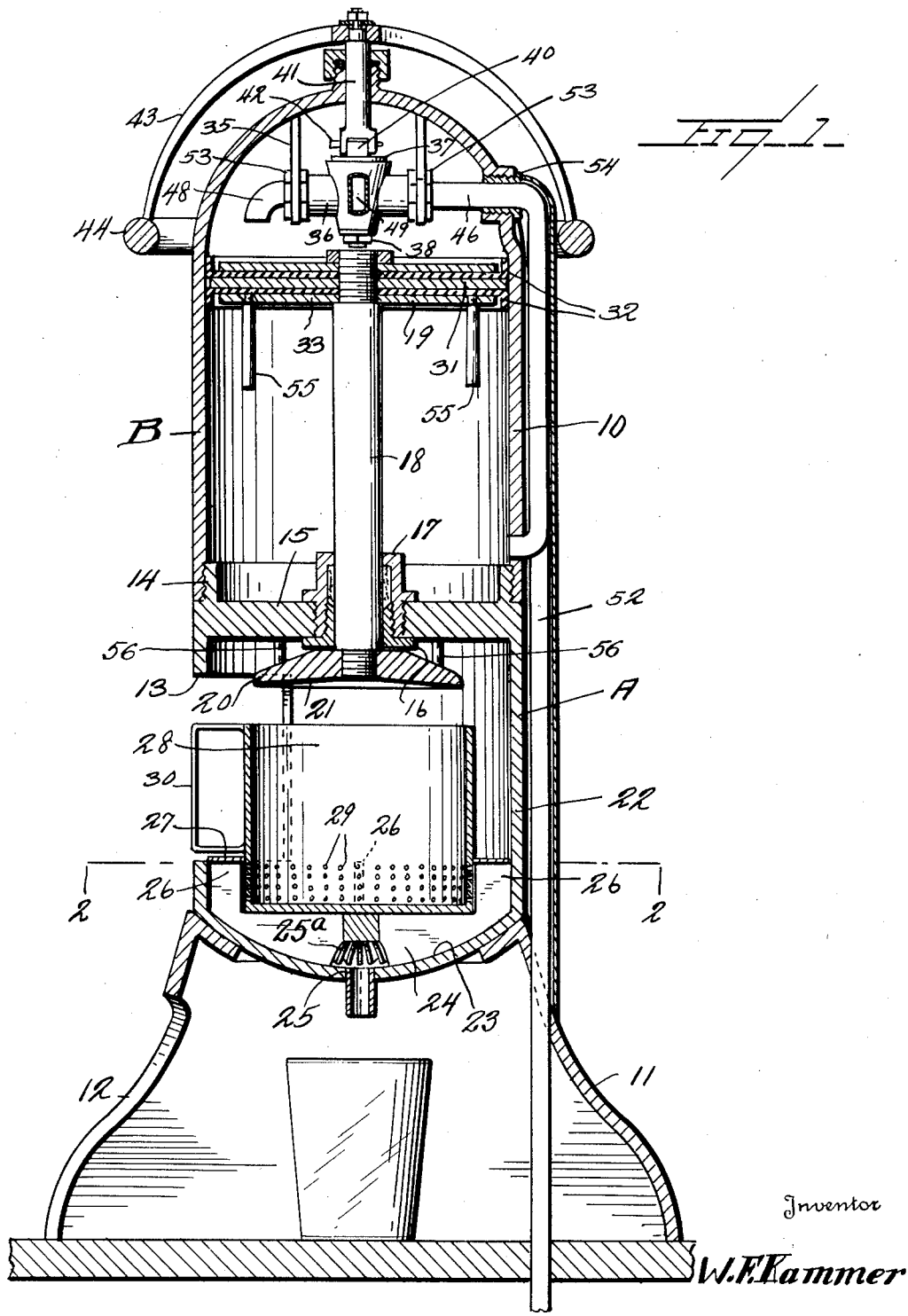

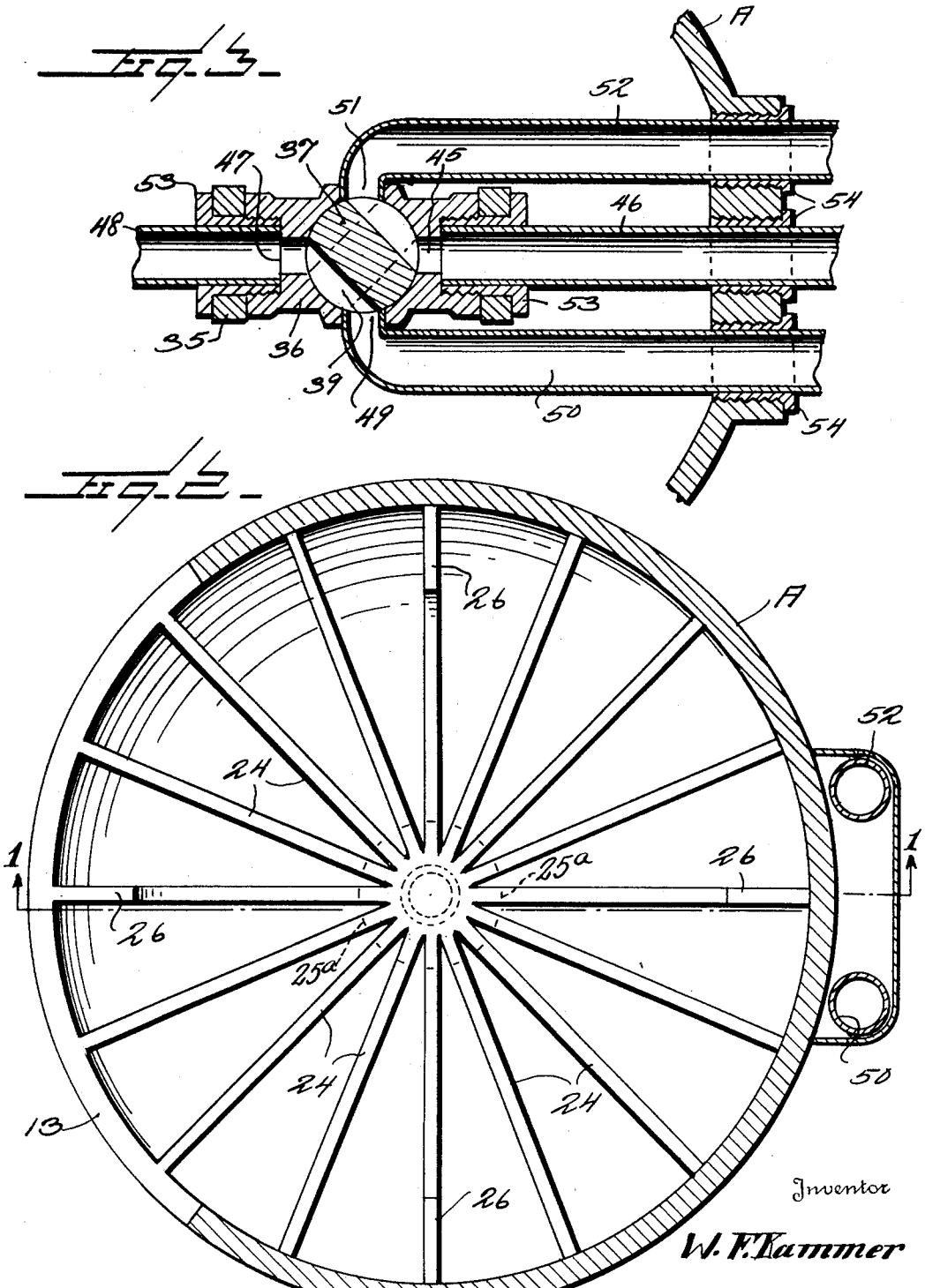

1,939,556

UNITED STATES PATENT OFFICE 1,939,556

HOUSEHOLD PRESS FOR FRUITS AND VEGETABLES

William F. Kammer, Wenatchee, Wash.

Application March 10, 1932. Serial No. 598,067

7 Claims. (Cl. 100—50)

This invention relates to presses for expressing the juices of fruits, vegetables and the like and the general object of the invention is to provide a household press in which the plunger of the press may be operated by water pressure taken from the city water mains or from other suitable source or by other fluid pressure, if desired.

A further object is to provide a press head so shaped as to force the pulp toward the center of a cup in which the fruit or vegetable to be pressed is disposed, thus preventing the pulp from being forced through the holes in the cup.

A further object is to provide a construction of this character embodying a hollow body, the upper portion of which is formed to provide a cylinder and the lower portion formed to provide a holder for a cup within which the fruit or vegetable may be placed, the cup being provided with a perforated portion in its side walls adjacent the bottom thereof and the bottom of the holder for the cup being so formed as to prevent the juice from squirting upward or outward to cause the juice to be all discharged through the bottom of the holder.

A further object is to provide a relatively simple and effective press of this character which will extract the juice from any kind of citrus fruit, grapes or apples or other vegetables which is so constructed that there will be but little chance of the press sticking and in which the juice will be clean and not contain either pulp or seeds.

Other objects will appear in the course of the following description.

My invention is illustrated in the accompanying drawings, wherein:—

Figure 1 is a vertical sectional view of a press on line 1—1 of Figure 2 constructed in accordance with my invention;

Figure 2 is an enlarged section on the line 2—2 of Figure 1;

Figure 3 is a fragmentary horizontal sectional view through the upper end of the cylinder, the valve and the inlet and outlet pipes controlled thereby.

Referring to the drawings, it will be seen that my press comprises a body 10 and a base 11 upon which the body is supported which may or may not be made integral with the body, the base being annular in cross section but being broken away at 12 to permit a glass or other container to be inserted to receive the juice from the press. The body is formed with an opening 13 in the wall of the body above the base, into which the expressing cup may be inserted.

Referring to Figure 1 it will be seen that the body is preferably made in two sections A and B having screw-threaded engagement with each other at 14. The lower section of the body below the screw-threads 14 is formed with the transversely extending web or wall 15 having a central opening within which are disposed suitable glands as 16 and 17 through which a piston rod 18 passes. Mounted upon the upper end of the piston rod is the piston 19 which operates within the cylinder formed by the upper section B, the lower end of this piston rod carrying a press head 20, the under face 21 of which is slightly concave. When fluid pressure is admitted into the upper portion of the cylinder 22 within which the piston operates, the piston is forced downward and the press head 20 expresses the juice from the fruit or vegetable in the cup.

Before describing the particular construction of the valve whereby to control the inlet of liquid to the interior of the cylinder 22, I will describe the lower end of the body. The lower section A as illustrated in Figure 2 is downwardly curved or, in other words, has a concave bottom 23. This concave bottom is intersected by a plurality of radial webs 24 and the bottom is provided with the outlet aperture 25 discharging downward through the bottom and into the receptacle disposed within the base, as illustrated in Figure 1. Certain of the webs 24, as for instance, four of these webs as shown in Figure 2 are provided with the upwardly extending portions 26 which extend upward to a height above the upper edges of the other webs 24 and which act to center the cup upon the webs. The webs 24 and webs 26 immediately above the opening 25 are cut away as at 25a to permit the passage of juices in the spaces between the webs through the central opening 25.

The opening 13 as shown in Figure 1 has its lower wall coincident with the upper edges of the portions 26. A cup guiding washer 27 is detachably supported upon these outstanding webs or lugs 26. The cup 28 is cylindrical in form, open at the top and has a closed bottom. The wall of the cup, however, just above the bottom is formed with a perforated zone 29. The cup is provided with a handle 30 and the cup has an internal diameter only slightly greater than or approximately fitting the press head or plunger 20.

In use, the cup is inserted through the opening 13 and is centered by the inner edges of the lugs or webs 26. The perforated zone 29 of the cup does not extend above these lugs 26 under these circumstances and the washer or ring 27 is, therefore, disposed just above this perforated zone 29. Hence when the press head 21 descends, it forces expressed juices outward through the perforations 29 and these juices trickle downward to the outlet opening 25 over the concave bottom 23. It will be seen that the radial webs 24 give full support to the bottom of the cup so that the cup will not be crushed or deformed by the depression of the press head 20. Inasmuch as the under face of the press head 20 is slightly concave, it will act to force the pulp toward the center and not to the sides, thus preventing the pulp from being forced through the holes 29. The top of the press head is tapered downward toward the outer edge to prevent a jam in case any parings or pulp were forced around the head between it and the cup wall. The holes in the cup 28 are in the sides only and the principal force being down and toward the center of the head, the pulp will not tend to be forced through the holes.

The piston 19 may be constructed in any suitable manner but as shown it consists of the piston head 31, the cup-leathers 32, and the washers 33.

For the purpose of causing the movement of the piston within the cylinder, I provide supply pipes entering the upper and lower ends of the cylinder above and below the piston and a manually controllable valve for controlling the direction of circulation of the motive fluid. As illustrated, though I do not wish to be limited to this, the upper end of the cylinder 22 is upwardly curved and carries the brackets 35. Mounted within these brackets 35 is the valve body 36 wherein there is disposed the tapering valve 37. This is held to its tapering seat by means of a nut 38 engaging the valve stem. The valve is cut away at diametrically opposite points at 39 and the upper end of the valve is provided with a many-sided head 40. The operating stem 41 at its lower end is provided with a socket to receive said head 40, this socket being pinned to the head by the pin 42. The stem extends upward through a stuffing box of any suitable character in the upper end of the cylinder and is there provided with the radiating spokes 43 carrying the circular handle 44, these spokes extending downward and outward so that the rim or handle 44 is disposed beneath the top of the cylinder in any convenient position to be properly manipulated.

The valve body 36 is provided with four ports. The port 45 is connected by a pipe 46 to the lower end of the cylinder 22. The opposite port 47 is connected to a short discharge pipe 48 discharging into the upper end of the cylinder above the piston. Entering one side of the valve body is a port 49 connected to a pipe 50 leading to the water supply and an opposite port 51 is connected to a pipe 52 which constitutes the drainage or outlet pipe. Brass bushings 53 are screwed into the ends of the valve body and engage the brackets 35. Bronze bushings 54 are screwed into the casting constituting the cylinder 22 and through these bushings the pipes 45, 50 and 52 pass, the bushings permitting the pipes to be pinned to the bushings, thus doing away with packing at this point. As illustrated in Figure 3, when the valve is turned to one position, the water supply pipe 50 will be connected to the inlet pipe 48 while the pipe 46 will be connected to the outlet pipe 52. Thus water will be permitted to enter the upper portion of the cylinder, forcing the piston downward, while the water below the piston will be forced out through the outlet pipe 52. When the valve is turned in the opposite direction, the lower portion of the cylinder will be connected to the inlet pipe 50 and the upper portion of the cylinder will be connected to the outlet pipe 52 and the piston will be forced upward.

It will be seen that the structure which I have provided is very compact, that it provides for the use of ordinary water pressure from city mains as a means for operating the press head, that the pressure thus provided is amply sufficient for the purpose of squeezing the juice from fruit or from vegetables.

Any desired means may be used for preventing the piston 30 from striking either the nut 38 or the stuffing box gland 17. For this purpose, I have shown pins 5 projecting downwardly from the piston 31 and adapted to engage the septum 15 and prevent the piston from striking the gland 17 and have shown pins 56 projecting upwardly from the press head 20 to prevent the pistons from striking the nut 38. Obviously I do not wish to be limited to this means, however.

It will further be seen that the device is readily cleaned and can be readily taken apart for repairs or replacement.

I claim:—

1. A press comprising a body formed to provide a cylinder and a cylindrical connected hollow lower portion, having a concave bottom having a juice discharging opening, there being cup supports above the opening, the wall of the cylindrical lower portion having an opening for the insertion of a cup, a cup insertible through the opening and having an imperforate bottom, the side wall of the cup having a zone of perforations adjacent the bottom and a piston in the cylinder carrying a press head movable into and out of the cup.

2. A press head comprising a cylindrical body having an upper section and a lower section, the lower section having a transverse wall defining the lower end of a cylinder constituted by the upper section of the body, the lower section of the body having a concave bottom formed with a central discharge opening, vertically disposed radial webs mounted within the lower section at the bottom thereof, radial webs disposed to extend upward from certain of the first named webs and extending inward from the wall of the lower section, the lower section having an opening, the lower wall of which is coincident with the upper ends of said last-named webs, a press head disposed in the lower section, a piston in the upper section operatively connected to the head, manually controllable means for discharging fluid into the upper or lower end of the upper section to cause the piston to move downward or upward, and a cup disposable upon the seat and centered by said second-named webs, the cup having an imperforate bottom, the side wall of the cup having a zone of perforations adjacent the bottom, the zone of perforations having a depth equal to the height of said webs, and an annular shield supported by said webs and disposed immediately above the zone of perforations when the cup is in place.

3. A press comprising a body constituting a cylinder and connected hollow lower portion having a concave bottom having a juice discharge opening, the bottom having a cup seat and the lower portion of the body having an opening for the insertion of a cup within which the article to be pressed may be disposed, a piston in the cylinder, a piston rod extending through the bottom of the cylinder into the interior of the lower portion and carrying a press head, and means for discharging liquid into the upper or lower end of the cylinder and carrying away liquid from the upper or lower end of the cylinder comprising a valve body having four ports, two of said ports being connected respectively to the upper and lower ends of the cylinder, one of said ports being connected to a source of supply and the other to a drain pipe, and manually actuatable means for shifting said valve to connect either one of the first named ports with the supply and drain ports.

4. A press of the character described, comprising a body having an upper portion and a lower portion having a seat for the article to be pressed and the upper portion providing a cylinder, a piston disposed in the cylinder and having a piston rod extending through the lower head of the cylinder and into the lower portion of the body, a press head carried on the lower end of the piston rod, a valve disposed in the upper portion of the cylinder and having a valve stem extending through the top of the cylinder and a rotatable valve core, the valve body having a port and a pipe connecting the port with the lower end of the cylinder, the valve body having a port discharging into the upper end of the cylinder, the valve body also having a pipe and a port extending out of the cylinder and connected to a source of supply, the valve body also having a port and a pipe extending out of the cylinder and constituting a drainage pipe, the valve when rotated in one direction connecting one of the first named ports with the supply port and the other of the first named ports with the drain port and when rotated in the other direction reversely connecting said ports, and a valve actuating handle connected to the valve stem and disposed exteriorly of the cylinder.

5. A press of the character described including a cylinder, a piston therein having a piston rod extending through the bottom of the cylinder and carrying a press head, a hollow element disposed below the cylinder and having a downwardly concave bottom provided with a juice discharging opening, a cup seat supported on said element below the press head and above said concave bottom and having a central depression, and a cup disposable in said depression and adapted to receive the article to be pressed, the cup having an imperforate bottom and having a zone of perforations in its side wall adjacent the bottom.

6. A press of the character described, including a cylinder, a piston therein having a piston rod extending through the bottom of the cylinder and carrying a press head, a hollow element disposed below the cylinder, the bottom wall of the hollow element having an outlet, a cup seat carried by the hollow element above the bottom thereof and having a central depression within which a cup is disposable, an annular member carried by the cup seat above the bottom of the central depression, and a cup disposable in the depression and adapted to receive the article to be pressed, the cup having an imperforate bottom and having a zone of perforations in its side wall adjacent the bottom, the depression being of sufficient depth to support the cup with its perforated portion below said annular member.

7. A press comprising a body providing a cylinder and a cylindrical, connected hollow lower portion having a concave bottom provided with a central juice discharging opening, the bottom having radial webs constituting a cup seat, the cylindrical lower portion having an opening just above the cup seat, a piston operating within the cylinder and having a press head and a cup insertible through the last named opening and having a diameter less than the diameter of the cup seat and adapted to receive the press head, the cup having an imperforate bottom and having a zone of perforations in its side wall adjacent the bottom, the lower portion of the press having means for centering the cup on said seat with relation to the press head.

WILLIAM F. KAMMER.